(12) United States Patent
Ray

(10) Patent No.: US 8,886,615 B2
(45) Date of Patent: Nov. 11, 2014

(54) WEB SERVICE PERFORMANCE OPTIMIZATION BY ADAPTIVELY USING COMPRESSION

(75) Inventor: Elton Tarik Ray, Livonia, NY (US)

(73) Assignee: Xerox Corporation, Norwalk, CT (US)

( * ) Notice: Subject to any disclaimer, the term of this patent is extended or adjusted under 35 U.S.C. 154(b) by 370 days.

(21) Appl. No.: 13/291,812

(22) Filed: Nov. 8, 2011

(65) Prior Publication Data
US 2013/0117298 A1    May 9, 2013

(51) Int. Cl.
*G06F 17/30* (2006.01)

(52) U.S. Cl.
CPC ................... *G06F 17/30091* (2013.01)
USPC .......................................... 707/693

(58) Field of Classification Search
CPC .......................................... G06F 17/30
USPC .......................................... 707/693
See application file for complete search history.

(56) References Cited

U.S. PATENT DOCUMENTS

| 7,420,992 B1 | 9/2008 | Fang et al. |
| 7,783,781 B1 | 8/2010 | Rothstein et al. |
| 7,844,740 B2 * | 11/2010 | Jungck ............... 709/247 |
| 7,882,084 B1 | 2/2011 | Amdahl |
| 2008/0228772 A1 * | 9/2008 | Plamondon ............... 707/10 |
| 2010/0095108 A1 * | 4/2010 | Kameyama et al. ....... 713/150 |

* cited by examiner

*Primary Examiner* — Khanh Pham
*Assistant Examiner* — Johnese Johnson

(57) ABSTRACT

A method, non-transitory computer readable medium and apparatus for optimizing a web service by adaptively using compression are disclosed. For example, the method receives a request for a data file, determines whether the data file should be compressed based upon a previous request for the data file, compresses the data file if it is determined that the data file should be compressed, and sends the data file in a compressed format.

20 Claims, 3 Drawing Sheets

WEB SERVICE PERFORMANCE OPTIMIZATION BY ADAPTIVELY USING COMPRESSION

The present disclosure relates generally to web service performance optimization and, more particularly, to a method, a non-transitory computer readable medium, and an apparatus for providing web service performance optimization by adaptively using compression.

BACKGROUND

Some data files are stored in a network. However, some web services require the data files to be transmitted to users over the network. If the data files are large, transmitting the data files over the network can consume large amounts of bandwidth, reduce resources for other data transmissions and reduce the overall efficiency of the network.

SUMMARY

According to aspects illustrated herein, there are provided a method, a non-transitory computer readable medium and an apparatus for optimizing a web service by adaptively using compression. One disclosed feature of the embodiments is a method that receives a request for a data file, determines whether the data file should be compressed based upon a previous request for the data file, compresses the data file if it is determined that the data file should be compressed and sends the data file in a compressed format.

Another disclosed feature of the embodiments is a non-transitory computer-readable medium having stored thereon a plurality of instructions, the plurality of instructions including instructions which, when executed by a processor, cause the processor to perform a method that receives a request for a data file, determines whether the data file should be compressed based upon a previous request for the data file, compresses the data file if it is determined that the data file should be compressed and sends the data file in a compressed format.

Another disclosed feature of the embodiments is an apparatus comprising a processor that is configured to receive a request for a data file, to determine whether the data file should be compressed based upon a previous request for the data file, to compress the data file if it is determined that the data file should be compressed and to send the data file in a compressed format.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
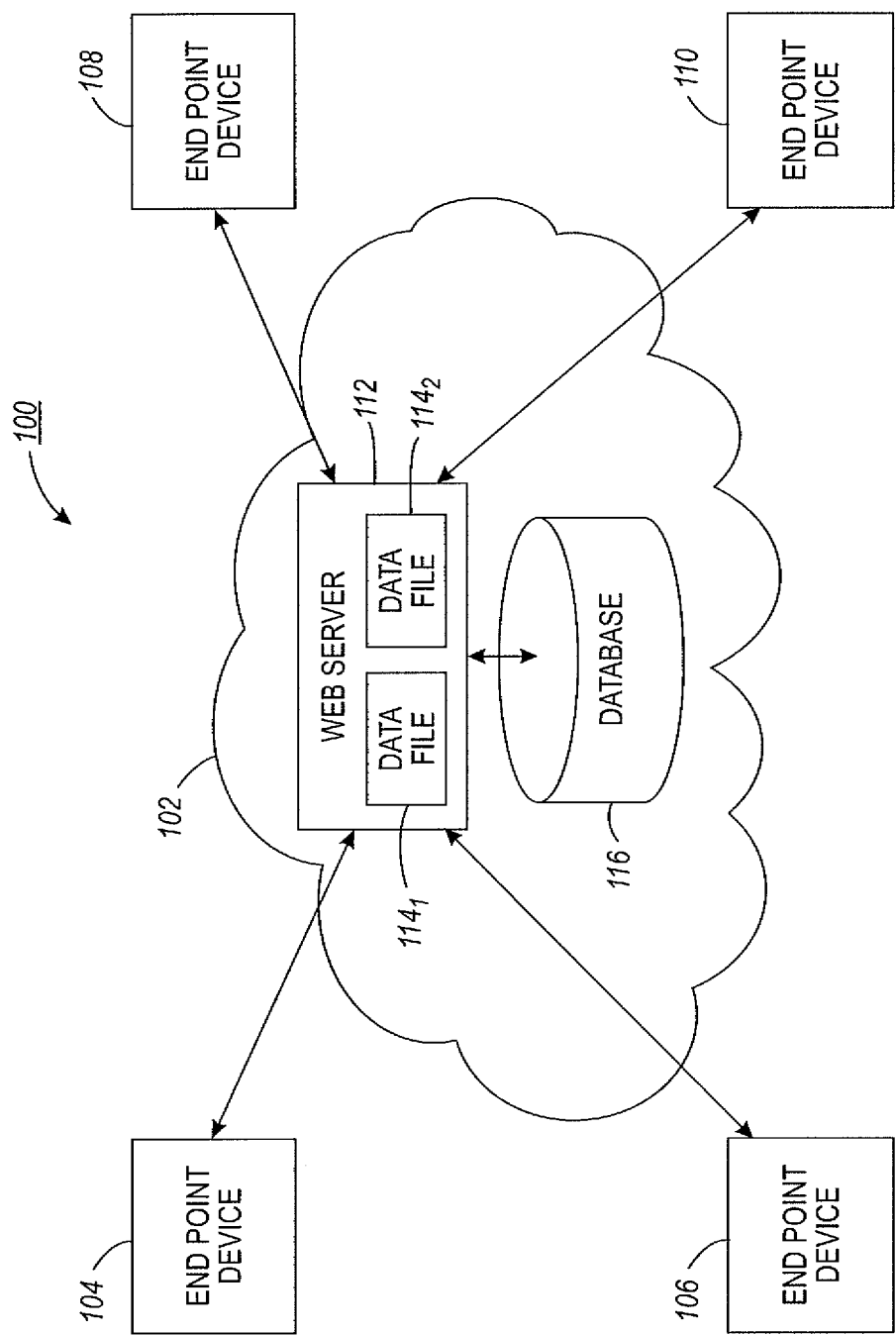
FIG. 1 illustrates one example of a communication network of the present disclosure.

The present disclosure broadly discloses a method, a non-transitory computer readable medium and an apparatus for optimizing a web service by adaptively using compression. As discussed above, some data files are stored in a network, e.g., within an application server or a storage device. However, some web services require the data files to be transmitted to users over the network. If the data files are large and uncompressed, transmitting the data files over the network can consume large amounts of bandwidth, reduce resources for other data transmissions and reduce the overall efficiency of the network.

Thus, it would be advantageous to compress the data files before the data files are transmitted. However, not all data files benefit from compression. For example, data files that possess a high degree of self-similarity in the data may benefit greatly from compression. In contrast, a data file that is completely random or has a low degree of self-similarity may not benefit from compression.

In addition, processing times to compress the data files may vary greatly depending on the size of the data file. For example, a very large file may take several seconds to minutes of processing time to compress. However, a very small file may only take a few seconds of processing time to compress. Thus, depending on these factors, the benefit of compression may vary from one data file to another data file.

Compression technologies may suffer from various drawbacks or inefficiencies because they do not take into account the variables associated with compressing data files noted above. For example, compression technologies may operate in an "all-or-nothing" fashion or may only compress specific file extensions. However, compressing every file may not be beneficial as the compression yield may not be acceptable, or the time lost to process the compression may be greater than the savings in transfer time by sending a compressed file. In addition, compressing only certain file extensions is too rigid and may prevent other data files from being compressed that may benefit from compression.

In one embodiment, the present disclosure optimizes web service performance by adaptively using compression. For example, the present disclosure determines whether or not to compress a data file before transmission of the data file. The decision as to whether to compress the data file is based upon a history of previous requests for the data file, and an analysis of various parameters associated with the compression. It is difficult to know beforehand the self similarity of a particular data file or how it will be handled by a given compression algorithm without actually compressing particular data file. The compression quality can only be known after the data file has been compressed. If it turns out that compressing a data file is a poor choice, then processing time should not be wasted in compressing the requested data file again, when the data file is requested at subsequent times. As a result, by analyzing statistics associated with compression of the data file from a previous request for the same data file, a decision can be made whether or not to compress the data file before it is sent. For example, if a decision is made not to compress the data file, then the data file is sent "as is" without compression.

To better understand the present disclosure, FIG. 1 illustrates an example of a communication network 100. In one embodiment, the communication network 100 includes an Internet Protocol (IP) network 102. The IP network 102 may be, for example, the Internet, a service provider network, an access network, a core network and the like.

In one embodiment, the IP network 102 may include a web server 112 and a database (DB) 116. In one embodiment, the web server 112 may be deployed as a general purpose application server. It should be noted that although only a single web server 112 is illustrated in FIG. 1, that any number of web servers 112 may be deployed.

In one embodiment, the web server 112 may include one or more data files $114_1$ and $114_2$ (herein also referred to collectively as data files 114). In one embodiment, a data file 114 may refer to a collection of data packaged into a single file. In other words, it should be noted that the compression techniques disclosed herein are not for compression at the individual packet level, but rather at the data file level. In one embodiment, the data files 114 are stored as uncompressed data files that may be sent over the IP network 102 to one or more endpoint devices 104, 106, 108 or 110.

In one embodiment, the one or more endpoint devices 104, 106, 108 and 110 may be any type of endpoint device capable of communicating with the IP network 102. Each of the endpoint devices 104, 106, 108 and 110 may have an unique IP address. When making a request for a data file, the IP address of the endpoint initiating the request may be referred to as the destination IP address. In one embodiment, the endpoint devices 104, 106, 108 and 110 may use Hypertext Transport Protocol (HTTP) to communicate with the IP network 102. In one embodiment, the endpoint devices 104, 106, 108 and 110 may be a personal computer, a lap-top computer, a tablet device, a cellular telephone, a smartphone, a netbook, and the like. Although only four endpoint devices 104, 106, 108 and 110 are illustrated in FIG. 1, it should be noted that any number of endpoint devices may be deployed.

In one embodiment, the database 116 may store records of previous requests for data files from the endpoint devices 104, 106, 108 and 110. The records may include values for various parameters associated with a previously performed compression of a data file and an unique file identifier for each data file. A few examples of the types of values and parameters that may be stored in the database 116 may include a date and time of the previous request, whether the requested data file was compressed, a processing time to compress the data file, a compression yield for the data file (e.g., the size of the compressed file relative to the uncompressed file in terms of bytes or in terms of percentage of compression), a list of destination IP addresses of previous transmissions and an associated transfer time to each of the destination IP addresses from a respective source IP address, and the like.

The processing time may be defined as a time duration that it takes to compress the data file. The compression yield may be defined as the percent reduction in the size of the data file. The transfer time may be defined as a time duration that it takes to transmit a data file (e.g., a compressed data file or an uncompressed data file) from a source IP address to a destination IP address. For example, multiple web servers 112 may be deployed in the IP network 102, e.g., at different physical locations. Each web server 112 may have a different source IP address. As a result, the request for a data file from the endpoint 108 may be directed to a different web server 112 than a request for the same data file from the endpoint 106. Thus, the transfer times for the same data file may be different for the two endpoints 106 and 108 depending on which web server 112 the request is routed to.

It should be noted other types of data may be stored in the database 116 and the above examples should not be considered as limiting. In addition, although only a single database 116 is illustrated in FIG. 1, any number of databases 116 may be deployed.

In one embodiment, the web server 112 is responsible for processing any requests from the endpoints 104, 106, 108 and 110 and performing the compression of the data files 114 before transmission, if necessary. In one embodiment, the web server 112 may compress the data files 114 in a Multi-purpose Internet Mail Extensions (MIME) format.

In one embodiment, the web server 112 is in communication with the database 116. For example, when the endpoint 104 requests a data file $114_1$ from the web server 112, the web server 112 may access the database 116 to determine whether the data file $114_1$ was previously requested. In one embodiment, the web server 112 searches the database 116 to see if an unique file identifier associated with the file $114_1$ is found in the database 116.

If the data file $114_1$ is not found in the database 116, then the web server 112 may compress the data file $114_1$, record measurements of the values of various parameters associated with the compression of the data file $114_1$ and transmit the compressed data file. If the data file $114_1$ is found in the database 116, the web server 112 may analyze the various values of the parameters associated with the compression of the data file $114_1$ from the previous request to determine whether or not the data file $114_1$ should be compressed and transmitted. The details of the analysis are discussed in further detail below with reference to FIG. 2.

It should be noted that the network 100 has been simplified. For example, the network 100 may include other network elements (not shown) such as border elements, routers, switches, policy servers, security devices, a content distribution network (CDN) and the like. In addition, the network 100 may include additional networks between the endpoints (e.g., the endpoints 104, 106, 108 and 110) and the IP network 102 such as different access networks (e.g., wireless access networks, WiFi networks, cellular networks, cable networks, and the like) to reach the IP network 102.

Figure 2:
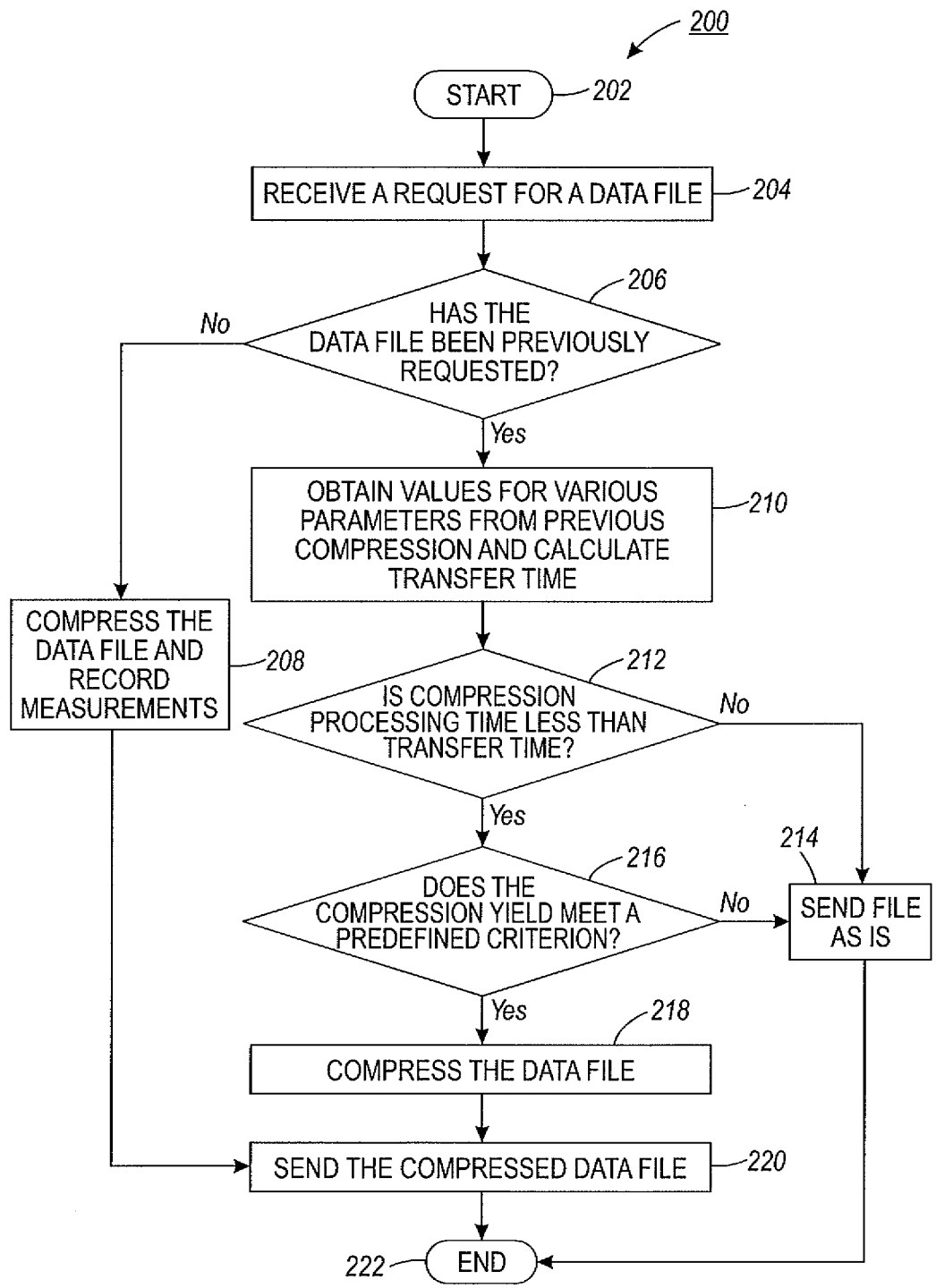
FIG. 2 illustrates an example flowchart of one embodiment of a method for optimizing a web service by adaptively using compression.
Figure 3:
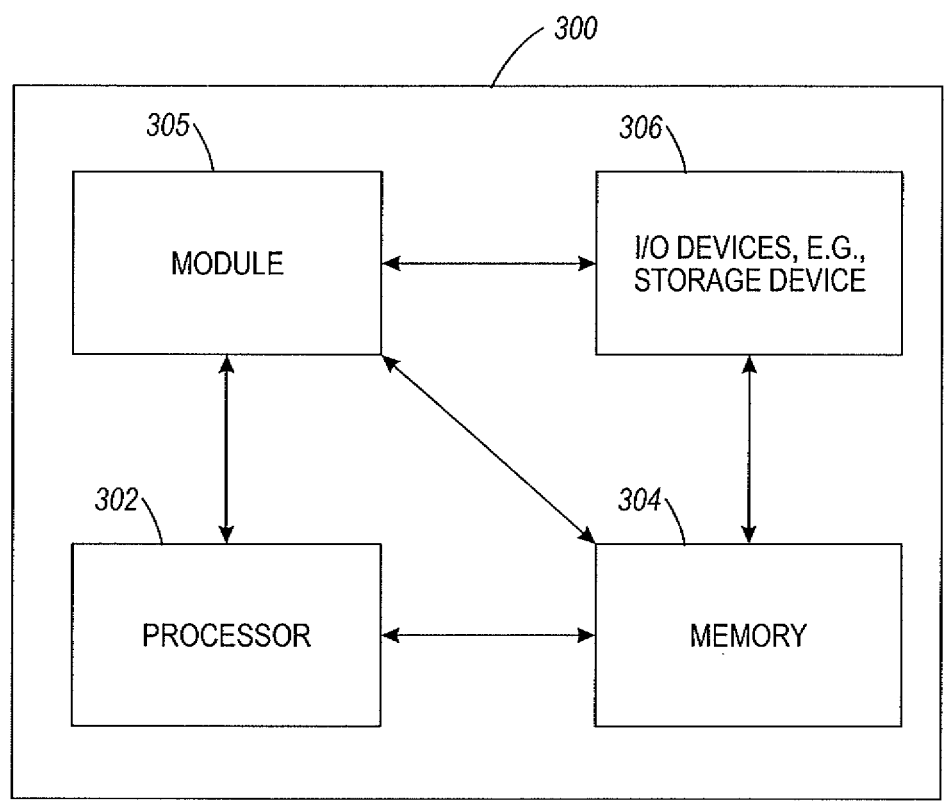
FIG. 3 illustrates a high-level block diagram of a general-purpose computer suitable for use in performing the functions described herein.

FIG. 2 illustrates a flowchart of a method 200 for providing web service performance optimization by adaptively using compression. In one embodiment, the method 200 may be performed by the web server 112 or a general purpose computer as illustrated in FIG. 3 and discussed below.

The method 200 begins at step 202. At step 204, the method 200 receives a request for a data file. In one embodiment, the request may be from a user via an endpoint device. The request may be sent using an HTTP protocol.

At step 206, the method 200 determines if the data file has been previously requested. For example, after the web server 112 receives the request for the data file, the web server 112 may access the database 116 using a unique file identifier associated with the requested data file. If no match to the unique file identifier is found, then the data file has never been requested.

As a result, the method 200 proceeds to step 208, where the method 200 compresses the data file and records measurements associated with the compression of the data file. For example, the date and time of the compression, the processing time to compress the data file, a compression yield of the data file, a transfer time from a source IP address of the web server to a destination IP address and the like, may be measured and recorded in the database 116. At step 220, the method 200 sends the compressed data file and ends at step 222.

However, referring back to step 206, if a match to the unique file identifier is found in the database 116, then the data file was previously requested and values of various parameters associated with a compression of the data file were recorded after the previous request. The method 200 proceeds to step 210.

At step 210, the method 200 obtains values for various parameters that will be used to analyze whether or not the data file should be compressed. For example, the method 200 may obtain the processing time to compress the data file and a compression yield of the data file.

In addition, the method 200 may calculate or obtain the transfer time of the data file based upon a source IP address of the web server 112 that the request is routed to and a destination IP address associated with the request received in step 204. As noted above, the IP network 102 may deploy multiple web servers 112, wherein each web server has a different source IP address. Thus, the transfer time may be calculated based upon which web server was selected to service the request for the data file. The destination IP address may be the IP address of the endpoint device that initiated the request.

In one embodiment, the method 200 may calculate the transfer time to transfer the data file in an uncompressed format and the transfer time to transfer the data file in a compressed format. The transfer times may be calculated based upon the destination IP address. For example, the method 200 may calculate the transfer times using a known metric such as an average transfer time per mile to estimate the transfer time based upon known distance between the destination IP address and the source IP address. The transfer times may vary based upon the state of the network as well, e.g., during a time of high traffic (e.g., during the day) versus during a time of low traffic (e.g., during the middle of the night). As a result, average transfers times for various source IP address and destination IP address pairs may be tracked and averaged over a period of time (e.g., one day, one week, one month, and the like). The tracked average may be used as the average transfer time per mile to calculate the estimated transfer times.

Alternatively, the transfer times may be obtained from the database 116 if the same destination IP address requested the same data file previously from the same source IP address and the transfer times were recorded with the previous request. The calculated transfer times may be used in determining whether the compression yield meets a predefined criterion as will be discussed in further detail below.

At step 212, the method 200 determines whether the processing time to compress the data file is less than the transfer time to transmit the data file in an uncompressed format. If the processing time is greater than the time it would take to transmit the file "as is" (i.e., without compression), then there may be no benefit to compressing the data file. As a result, the method 200 may proceed to step 214.

At step 214, the method 200 sends the data file "as is" without compressing the data file. The method 200 then proceeds to step 222 where the method 200 ends.

However, referring back to step 212, if the processing time to compress the data file is less than the transfer time to transmit the data file in the uncompressed format, then the data file may benefit from compression. As a result, the method 200 proceeds to step 216.

At step 216, the method 200 determines if the compression yield meets a predefined criterion. In one embodiment, the predefined criterion may be if the savings in transfer time by compressing the data file is greater than the processing time to compress the data file. To illustrate, a data file may have a low compression yield of 10%. As a result, the difference in the transfer time of the data file in a compressed format and an uncompressed format may only be a few seconds (e.g., 3 seconds). For example, the data file sent in an uncompressed format may have a transfer time of 10 seconds, whereas the data file sent in a compressed format may have a transfer time of 7 seconds.

However, the processing time to compress the data file may be 10 seconds. As a result, the processing time would be greater than the amount of time saved in the transfer time based upon the 10% compression yield. As a result, the compression yield would not meet the predefined criterion of time savings because more time would be wasted by taking time to compress the data file and then sending the compressed data file (e.g., a total of 17 seconds) rather than simply sending the data file in an uncompressed format (e.g., a total of 10 seconds).

In contrast, using a second illustration, a data file may have a high compression yield of 80%. As a result, the difference in the transfer time of the data file in a compressed format and an uncompressed format may be 10 seconds. For example, the data file sent in an uncompressed format may have a transfer time of 15 seconds, whereas the data file sent in a compressed format may have a transfer time of 5 seconds.

The processing time to compress the data file may be 6 seconds. As a result, the amount of time saved in the transfer time based upon the 80% compression yield would be greater than the processing time. As a result, the compression yield would meet the predefined criterion because more time would be saved by taking time to compress the data file and then sending the compressed data file (e.g., a total of 11 seconds) rather than simply sending the data file in an uncompressed format (e.g., a total of 15 seconds).

The example described above is provided as only one example of a predefined criterion. For example, in another embodiment, the predefined criterion may simply be a predefined threshold for a compression yield, e.g. 50% (or 40%, 30% and so on). As a result, if the compression yield from the previous request was recorded as being 60%, then the compression yield would be greater than the predefined threshold of 50% and meet the predefined criterion. It should be noted that the 50% threshold is only discussed above as an illustrative example.

In another embodiment, the predefined criterion for the compression yield may consider some performance factors to be more valuable to the network than other performance factors. For example, computer processing unit (CPU) utilization may be a more weighted factor than a transmission speed factor. For example, under heavy usage, there may not be sufficient processing resources to handle a very large demand for data file compression. As a result, in one embodiment, data file transmission speed may have to be sacrificed in exchange for a more efficient CPU utilization. Thus, an additional weighting factor regarding how busy a server is (i.e., the available processing capacity of the server) may be used as a predefined criterion.

In one embodiment, the method 200 may consider more than one criterion. Thus, any combination of the criteria discussed above may be used. In other words, step 216 may determine whether the compression yield meets more than one of the criterion discussed above and is not limited to consideration of only a single criterion.

At step 216, if the compression yield does not meet the predefined criterion, then the method 200 proceeds to step 214. At step 214, the method 200 sends the data file "as is" without compressing the data file. The method 200 then proceeds to step 222 where the method 200 ends.

Referring back to step 216, if the compression yield does meet the predefined criterion, then the method 200 proceeds to step 218. At step 218, the method 200 compresses the data file. In one embodiment, the data file may be compressed in a MIME format. Notably, the compression is performed and completed before the data file is sent. It should be noted that the present disclosure is not limited to any particular compression algorithm that is employed by the application server performing the compression of the data file.

At step 220, the method sends the compressed data file. In other words, the compressed data file is transmitted to the destination IP address that requested the data file. The method 200 then proceeds to step 222 where the method 200 ends.

It should be noted that although not explicitly specified, one or more steps or blocks of the method 200 described above may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in FIG. 2 that recite a determining operation, or involve a decision, do not necessarily require that both branches of the determining operation be practiced. In other words, one of the branches of the determining operation can be deemed as an optional step.

FIG. 3 depicts a high-level block diagram of a general-purpose computer suitable for use in performing the functions described herein. As depicted in FIG. 3, the system 300 comprises a hardware processor element 302 (e.g., a CPU), a memory 304, e.g., random access memory (RAM) and/or read only memory (ROM), a module 305 for providing web service performance optimization by adaptively using compression, and various input/output devices 306 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents, e.g., computer readable instructions pertaining to the method(s) discussed above can be used to configure a hardware processor to perform the steps of the above disclosed method. In one embodiment, the present module or process 305 for providing web service performance optimization by adaptively using compression can be loaded into memory 304 and executed by processor 302 to implement the functions as discussed above. As such, the present method or process 305 for providing web service performance optimization by adaptively using compression (including associated data structures) of the present disclosure can be stored on a non-transitory computer readable storage medium, e.g., RAM memory, magnetic or optical drive or diskette and the like. For example, the processor 302 can be programmed or configured with instructions (e.g., computer readable instructions) to perform the steps of method 200.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for optimizing a web service by adaptively using compression, comprising:
   receiving, via a processor, a request for a data file;
   determining, by the processor, whether the data file should be compressed based upon a previous request for the data file, wherein the determining comprises:
      accessing a database to find a record of the previous request associated with the data file;
      when the record of the previous request is found, then determining whether a processing time in compressing the data file is less than a transfer time of the data file; and
      determining whether the compression yield meets a predefined criterion of time savings, wherein it is determined that the data file should be compressed when the processing time is less than the transfer time of the data file and the compression yield is determined to meet the predefined criterion of time savings;
   compressing, by the processor, the data file when it is determined that the data file should be compressed; and
   sending, by the processor, the data file in a compressed format.

2. The method of claim 1, wherein the request is received by a web server.

3. The method of claim 2, wherein the data file is stored in an uncompressed format in the web server.

4. The method of claim 1, wherein the request comprises a request in a Hypertext Transfer Protocol (HTTP).

5. The method of claim 1, wherein the determining whether the processing time is less than the transfer time of the data file comprises:
   obtaining the processing time that is needed to compress the data file based upon the previous request for the data file; and
   calculating the transfer time of the data file upon a source internet protocol (IP) address of a web server and a destination IP address of the request.

6. The method of claim 1, wherein the determining whether the compression yield meets the predefined criterion comprises:
   calculating a difference in an amount of time saved in a transfer of the data file that is uncompressed as compared to a total time to compress the data file and transfer of the data file that is compressed; and
   determining if the amount of time saved is greater than the processing time needed to compress the data file.

7. The method of claim 1, wherein the compression yield meets the predefined criterion if the compression yield is greater than a predefined threshold.

8. The method of claim 1, wherein the data file is compressed in a Multipurpose Internet Mail Extensions (MIME) format.

9. The method of claim 1, wherein the compressing is performed and completed before the data file is sent.

10. A non-transitory computer-readable medium storing a plurality of instructions, which when executed by a processor, cause the processor to perform operations for optimizing a web service by adaptively using compression, the operations comprising:
    receiving a request for a data file;
    determining whether the data file should be compressed based upon a previous request for the data file, wherein the determining comprises:
       accessing a database to find a record of the previous request associated with the data file;
       when the record of the previous request is found, then determining whether a processing time in compressing the data file is less than a transfer time of the data file; and
       determining whether the compression yield meets a predefined criterion of time savings, wherein it is determined that the data file should be compressed when the processing time is less than the transfer time of the data file and the compression yield is determined to meet the predefined criterion of time savings;
    compressing the data file when it is determined that the data file should be compressed; and
    sending the data file in a compressed format.

11. The non-transitory computer-readable medium of claim 10, wherein the request is received by a web server.

12. The non-transitory computer-readable medium of claim 11, wherein the data file is stored in an uncompressed format in the web server.

13. The non-transitory computer-readable medium of claim 10, wherein the request comprises a request in a Hypertext Transfer Protocol (HTTP).

14. The non-transitory computer-readable medium of claim 10, wherein the determining whether the processing time is less than the transfer time of the data file comprises:
   obtaining the processing time that is needed to compress the data file based upon the previous request for the data file; and
   calculating the transfer time of the data file upon a source Internet protocol (IP) address of a web server and a destination IP address of the request.

15. The non-transitory computer-readable medium of claim 10, wherein the determining whether the compression yield meets the predefined criterion comprises:
   calculating a difference in an amount of time saved in a transfer of the data file that is uncompressed as compared to a total time to compress the data file and transfer of the data file that is compressed; and
   determining if the amount of time saved is greater than the processing time needed to compress the data file.

16. The non-transitory computer-readable medium of claim 10, wherein the compression yield meets the predefined criterion if the compression yield is greater than a predefined threshold.

17. The non-transitory computer-readable medium of claim 10, wherein the data file is compressed in a Multipurpose Internet Mail Extensions (MIME) format.

18. A method for optimizing a web service by adaptively using compression, comprising:
   receiving, by a processor, a request at a web server for a data file that is stored in the web server located in a communication network, wherein the request is received via a Hypertext Transfer Protocol (HTTP);
   determining, by the processor, that the data file has been previously requested;
   obtaining, by the processor, based on the data file that was previously requested, a compression yield for the data file and a processing time to compress the data file;
   calculating, by the processor, a transfer time of the data file based upon a destination internet protocol (IP) address of the request;
   determining, by the processor, that the processing time to compress the data file is less than the transfer time;
   determining, by the processor, that the compression yield meets a predefined criterion based upon a comparison of a total time to compress the data file and to transfer the data file that is compressed against a time to transfer the data file that is uncompressed;
   compressing, by the processor, the data file in a Multipurpose Internet Mail Extensions (MIME) format to create a compressed data file; and
   sending, by the processor, the compressed data file in response to the request.

19. The method of claim 18, wherein the data file is stored in an uncompressed format in the web server.

20. The method of claim 18, wherein the predefined criterion comprises the amount of time saved being greater than the processing time needed to compress the data file.

\* \* \* \* \*